United States Patent
Stenfelt et al.

(10) Patent No.: US 9,185,544 B2
(45) Date of Patent: Nov. 10, 2015

(54) APPARATUSES AND METHODS FOR REDUCING LOCATION UPDATE SIGNALING BETWEEN NETWORK NODES OF A MOBILE COMMUNICATION NETWORK

(71) Applicant: Telefonaktiebolaget L M Ericsson (publ), Stockholm (SE)

(72) Inventors: John Stenfelt, Goteborg (SE); Yong Yang, Molndal (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 106 days.

(21) Appl. No.: 13/870,776

(22) Filed: Apr. 25, 2013

(65) Prior Publication Data

US 2014/0323146 A1 Oct. 30, 2014

(51) Int. Cl.
*H04W 24/00* (2009.01)
*H04W 8/02* (2009.01)
*H04W 28/02* (2009.01)
*H04L 12/24* (2006.01)

(52) U.S. Cl.
CPC .............. *H04W 8/02* (2013.01); *H04L 41/0893* (2013.01); *H04W 28/0226* (2013.01); *H04W 28/0247* (2013.01); *H04W 28/0284* (2013.01)

(58) Field of Classification Search
None
See application file for complete search history.

(56) References Cited

U.S. PATENT DOCUMENTS

| 2011/0158090 A1 | 6/2011 | Riley et al. |
| 2011/0199903 A1 | 8/2011 | Cuervo |
| 2012/0140620 A1 | 6/2012 | Hogan et al. |

FOREIGN PATENT DOCUMENTS

| EP | 2466790 A1 | 6/2012 |
| EP | 2512176 A1 | 10/2012 |
| WO | 2012093832 A2 | 7/2012 |

OTHER PUBLICATIONS

International Search Report from PCT/EP2014/054175, dated Jul. 28, 2014, 5 pages.
Written Opinion from PCT/EP2014/054175, dated Jul. 28, 2014, 9 pages.
NTT DOCOMO "C-Plane/PCC based on Congestion Notification", SA WG2 Meeting #96, S2-130872, Agenda Item 7.6, Work Item/Release, UPCON Rel-12, 5 pages.

*Primary Examiner* — Erika A Washington
(74) *Attorney, Agent, or Firm* — Rothwell, Figg, Ernst & Manbeck, P.C.

(57) ABSTRACT

This disclosure describes apparatuses, methods and computer program products for reducing location update signaling in a mobile communications network. In some embodiments, a method is provided in which a mobility management and control (MMC) rule is provided to a location aware network node (LANN) (e.g., an MME). The MMC rule includes location information that specifies a location and an action associated with the location. In response to receiving mobility information pertaining to a mobile communication device (MCD), the LANN uses the mobility information and the location information to determine whether or not to perform the action associated with the location information.

20 Claims, 7 Drawing Sheets

APPARATUSES AND METHODS FOR REDUCING LOCATION UPDATE SIGNALING BETWEEN NETWORK NODES OF A MOBILE COMMUNICATION NETWORK

TECHNICAL FIELD

This disclosure relates to systems and methods for reducing location update signaling between a location aware network node (LANN) (e.g., MME, SGSN, TWAG) of a mobile communication network and a second network node, such as control system network node (CSNN) (e.g., PCRF, GGSN, PGW) of the mobile communication network.

BACKGROUND

A mobile communication network enables a mobile communication device (MCD) (e.g., a mobile phone, a tablet computer, or other mobile communication device) to communicate with other communication devices (e.g., Internet servers, other MCDs, etc.). Certain network nodes of the network are aware of the location (at least at a general level) of the MCDs attached to the network. Such network nodes are referred to herein as "location aware network nodes (LANNs)." For example, a long-term evolution (LTE) mobile communication network includes mobility management entities (MMEs) that are aware of the locations (e.g., tracking areas, cells, etc.) in which the MCDs attached to the network can be found. Other network nodes in the network utilize location update information received from a LANN. These other network nodes are referred to herein as "control system network nodes (CSNNs)." A problem exists, however, in that the location update signaling between LANNs and CSNNs significantly adds to the amount of overhead control signaling in the mobile communication network. It is desired, therefore, to reduce the amount location update signaling in the mobile communication network.

SUMMARY

This disclosure describes apparatuses, methods and computer program products for reducing location update signaling in a mobile communications network. Advantageously, in some embodiments, the method is performed by a location aware network node (LANN) (e.g., an MME, SGSN, TWAG). In some embodiments the method includes the LANN receiving from a second network node a mobility management and control, MMC, rule. The MMC rule may include: i) location information and ii) action information specifying a set of one or more actions, wherein the action information is associated with the location information. The method also includes the LANN receiving from a radio access network (RAN) network node a message comprising mobility information related to a mobile communication device, MCD. In response to receiving the message, the LANN uses i) the location information included in the MMC rule and ii) the mobility information included in the received message to determine whether the LANN should perform the set of one or more actions specified by the action information included in the MMC rule. The LANN performs the set of one or more actions specified by the action information included in the MMC rule in response to determining that it should perform the actions.

In some embodiments, the location information included in the MMC rule specifies a set of one or more locations, the mobility information included in the received message comprises second location information identifying a location within which the MCD is located, and the step of using i) the location information from the MMC rule and ii) the mobility information to determine whether to perform the set of one or more actions comprises: using the second location information to determine whether the MCD is located in a location included in the set of one or more locations specified by the location information from the MMC rule.

In some embodiments, the location information included in the MMC rule includes a preconfigured location definition that references location information previously stored in the LANN. In some embodiments, the location information included in the MMC rule includes a dynamic location definition that includes one or more of: 1) a list of one or more tracking areas, 2) a list of one or more base station identifiers, 3) a list of one or more cell identifiers, 4) a list of routing area identifiers, and 5) a list comprising one or more of a set of Service Set Identifiers, SSIDs, and a set of basic SSIDs, BSSIDs.

In some embodiments, prior to receiving the MMC rule, the LANN transmits a request for an MMC rule for the MCD, wherein the MMC rule is specific to the MCD. The LANN may transmit the request for the MMC rule in response to receiving a control message transmitted by the MCD. The control message may be one of: an Attach Request message, an Activate PDP Context Request, a PDN connectivity request, a Tracking Area Update, and a Routing Area Update.

In some embodiments, the LANN transmits the request for the MMC rule in response to detecting a certain event related to the MCD. The certain event related to the MCD may be one of: a RAT-change, a time zone change, subscription data change, and a location change.

In some embodiments, the LANN transmits the request for the MMC rule by transmitting to a SGW a control message that includes the request for the MMC rule, and the control message is one of: a Create Session Request message, a Modify Bearer Request message, a Change Notification Request message.

In some embodiments, the method also includes the LANN transmitting the received MMC rule to a second LANN as part of an inter mobility procedure.

In some embodiments, the action information included in the MMC rule includes one or more of: a preconfigured action definition that references action information previously stored in the LANN, which previously stored action information includes a set of one or more action identifiers, each of which identifies a particular action, and a dynamic action definition that includes a set of one or more action identifiers, each of which identifies a particular action.

In some embodiments, wherein the LANN receives the MMC rule directly from the second network node. In other embodiments, the LANN receives the MMC rule directly from a third network node that received the MMC rule transparently from a fourth network node that received the MMC rule transparently from the second network node. The third network node may be a Serving Gateway, SGW, the fourth network node may be a Packet Data Network Gateway, PGW, and the second network node may comprise a Policy and Charging Rules Function, PCRF.

In some embodiments, the LANN is one of: a) a Mobility Management Entity, MME; b) a Serving GPRS Support Node, SGSN; and c) a Trusted WLAN Access Gateway, TWAG, and the second network node is one of: a) a Policy and Charging Rules Function, PCRF; b) a Home Subscriber Server, HSS; and c) a Home Location Register, HLR.

In some embodiments, prior to the LANN receiving the MMC rule, the LANN transmits to the second network node information indicating that the LANN is configured to process MMC rules.

In another aspect, a LANN apparatus is provided.

In some embodiments, the LANN apparatus includes: A) a first network interface for receiving a mobility management and control, MMC, rule transmitted by a second network node, wherein the MMC rule comprises i) location information and ii) action information specifying a set of one or more actions, wherein the action information is associated with the location information; B) a second network interface for receiving from a radio access network (RAN) network node a message comprising mobility information related to a mobile communication device, MCD; and C) a data processing.

The data processing system is configured such that, after the LANN apparatus receives the MMC rule and the message, the data processing system performs a process that includes: using i) the location information included in the MMC rule and ii) the mobility information included in the received message to determine whether the data processing system should perform the set of one or more actions specified by the action information included in the MMC rule; and performing the set of one or more actions specified by the action information included in the MMC rule in response to determining that it should perform the actions.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments.

DETAILED DESCRIPTION

Figure 1:
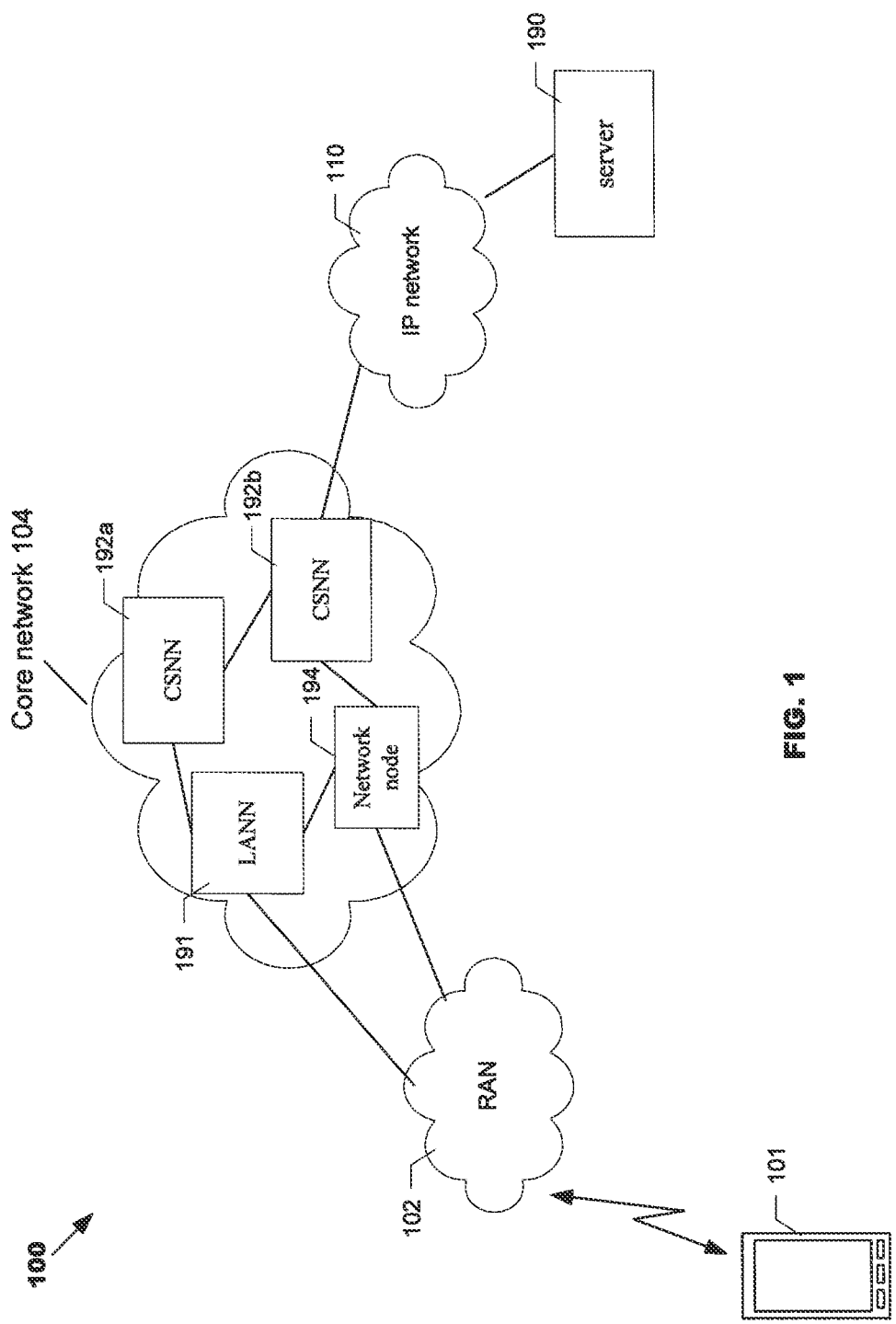
FIG. 1 illustrates an example generic mobile communications network.

FIG. 1 illustrates an example generic mobile communications network 100. Network 100 includes a radio access network (RAN) 102 and a core network (CN) 104. RAN 102 and CN 104 function together to enable an MCD 101 to communicate with other communication devices, such as, for example, a server 190, which is connected to an Internet Protocol (IP) network 110. As illustrated in FIG. 1, CN 104 may include a number of network nodes, including location aware network node (LANN) 191, control system network nodes (CSNNs) 192a and 192b, and other network nodes represented by network node 194.

Figure 2:
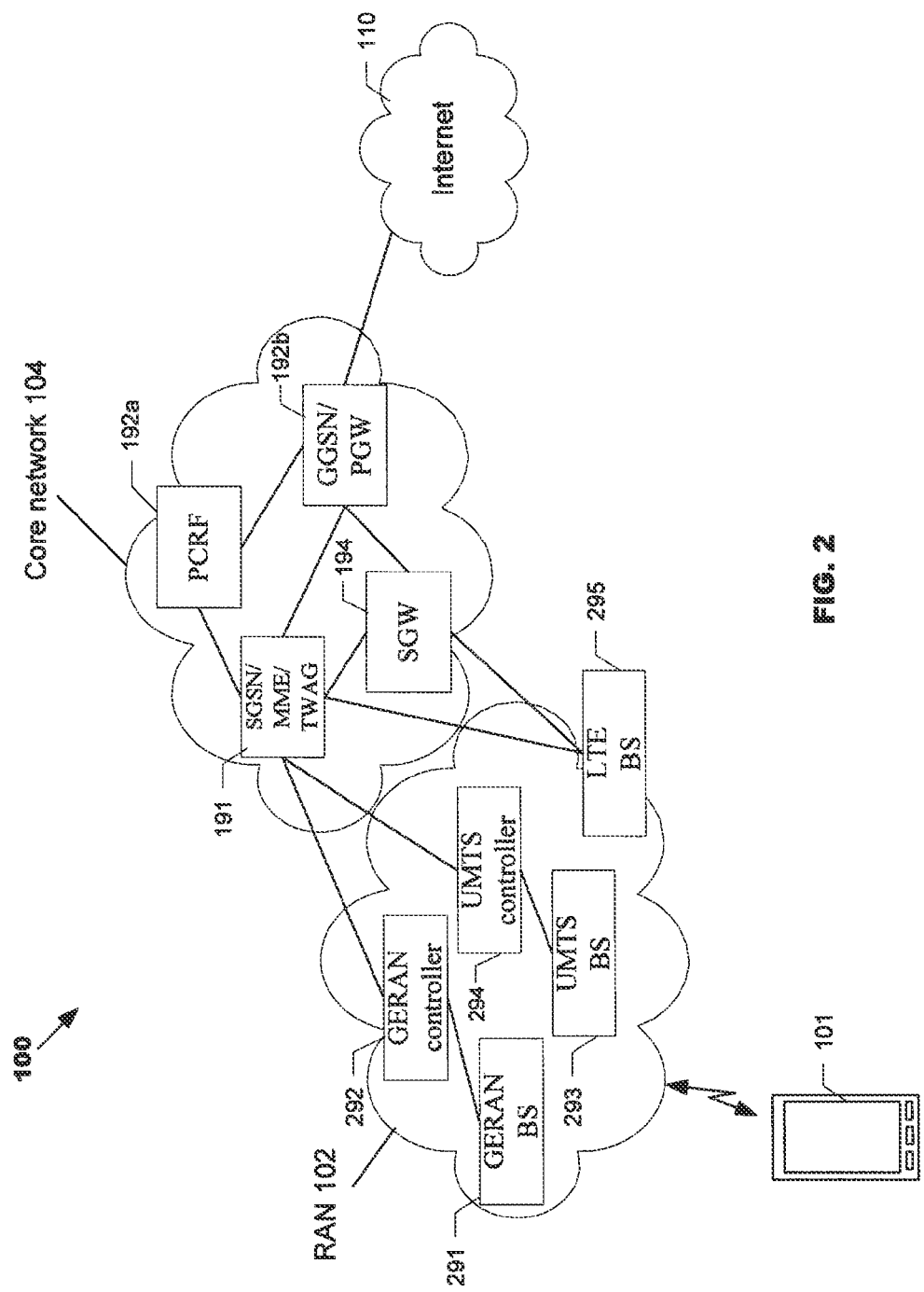
FIG. 2 illustrates an example mobile communication network.

FIG. 2 illustrates RAN 102 and CN 104 according to some particular embodiments. As illustrated in FIG. 2, in some embodiments, RAN 102 may include various different RAN network nodes 291-295, such as different base stations utilizing different access technologies. Specifically, FIG. 2 shows that RAN 102 may include an LTE base station 295 (a.k.a., eNodeB or eNB), a UMTS base station 293 (a.k.a., nodeB) and a corresponding controller 294, and a GSM base station 291 and a corresponding controller 292.

As also illustrated in FIG. 2, the network nodes of CN 104 may include various network nodes that perform various functions. Specifically, FIG. 2 shows that, in some embodiments: LANN 191 may be or include, for example, a Serving GPRS Support Node (SGSN), a Mobility Management Entity (MME) or a Trusted WLAN Access Gateway (TWAG); the CSNN 192a may be or include, for example, a Policy and Charging Rules Function (PCRF); the CSNN 192b may be or include, for example, a Gateway GPRS Support Node (GGSN) or a Packet Data Network (PDN) Gateway (PGW); and network node 194 may be or include, for example, a Serving Gateway (SGW) node.

This disclosure describes a technique in which location update signaling between LANN 191 and one or more CSNNs 192a,b is reduced.

Figure 3:
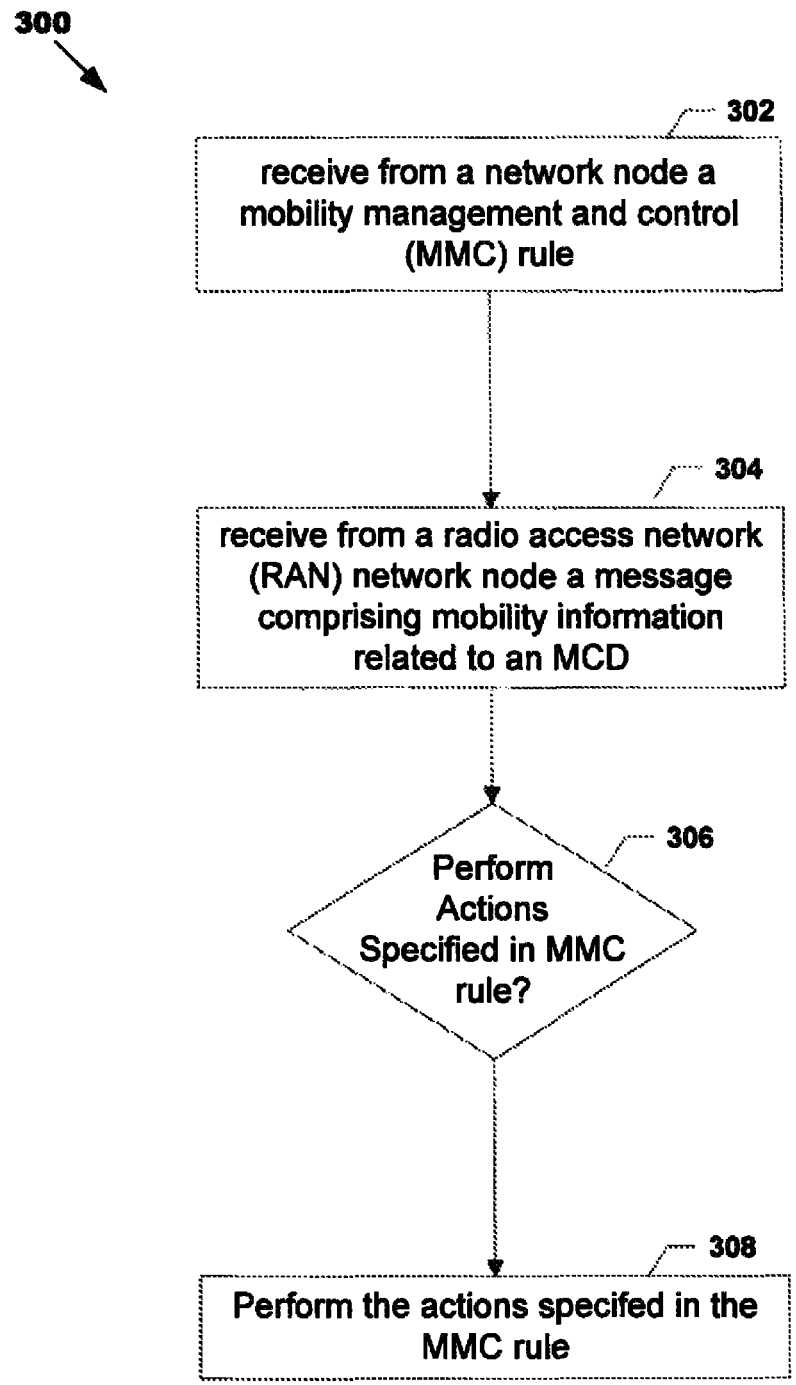
FIG. 3 is a flow chart illustrating a process according to some embodiments.

Referring now to FIG. 3, FIG. 3 is a flow chart illustrating a process 300 for reducing location update signaling within the core network 104. Process 300 may begin with step 302, where LANN 191 receives a mobility management and control (MMC) rule 503 (see FIG. 5) transmitted by CSNN 192a or 192b (hereafter "CSNN 192"). For example, LANN 191 may receive MMC rule 503 directly or indirectly from CSNN 192. For instance, in some embodiments, LANN 191 and CSNN 192 have a direct interface that enables them to communicate directly with each other (see e.g., FIG. 5) so that LANN 191 can receive the MMC rule 503 directly from CSNN 192. In other embodiments, no direct interface exists between LANN 191 and CSNN 192 (see e.g., FIG. 6), in which case LANN 191 receives the MMC rule 503 indirectly from CSNN 192.

In some embodiments, MMC rule 503 includes location information specifying a location. In some embodiments, MMC rule 503 further includes action information, associated with the location information, specifying a set of one or more actions.

The location information included in MMC rule 503 may be or include a preconfigured location definition, which references pre-configured location information previously stored in LANN 191. Such previously stored location information may include one or more of: 1) a list of one or more tracking areas, 2) a list of base station identifiers, 3) a list of cell identifiers (e.g., a list of EUTRAN Cell Global IDs (ECGIs)), etc. Additionally, the location information included in the MMC rule may be or include a dynamic location definition, which may include one or more of: 1) a list of one or more tracking areas, 2) a list of base station identifiers, 3) a list of cell identifiers, etc. Pre-configured location information is useful whenever a location dependent policy is applicable for a larger group of users. Dynamic location definitions are useful whenever there are user specific policies for certain locations (e.g. a specific cell). The dynamic location definition may, for example, consist of information that identifies on or more of: a single cell, a group of cells, all cells of all eNodeBs that connected to the same IP sub-network (e.g., eNodeBs that can be identified by a certain IP-address mask), and one or several tracking areas/routing areas (TA/RA).

The action information included in the MMC rule 503 may include one or more of: 1) a preconfigured action definition, which references pre-configured action information previously stored in LANN 191, which previously stored action information includes a set of one or more action identifiers, each of which identifies a particular action, and 2) a dynamic action definition, which includes a set of one or more action identifiers, each of which identifies a particular action. The identified actions may include a) mobility information reporting control actions, b) mobility management control actions, and c) congestion and overload control actions.

The mobility information reporting control actions may include: a) reporting of entry or exit from area defined by the location definition and b) continuous cell updates within the location definition (this would be applicable, for example, if the location definition covers multiple cells).

The mobility management control actions may include: a) applying a certain set of node-level specific timers, e.g. periodic TAU and periodic RAU timers, for the MCD 101; b) provisioning of specific access restrictions to the MCD 101 and RAN 102; and c) provisioning of a certain values to the RAN 102 and/or MCD 101, such as, any value maintained by LANN 191 and supplied to the RAN/MCD.

An example of such a value is a Subscriber Profile ID (SPID) for RAT/Frequency Selection Priority that is used to define camp priorities in Idle mode and to control inter-RAT/inter-frequency handover in Active mode for E-UTRA access (see 3GPP TS 36.413 for details). The SPID (also known as RFSP Index in some specifications) may also be provided from the SGSN to the RNC, for UTRAN access (see 3GPP TS 25.413), and to the BSC for GERAN access (see 3GPP TS 48.018). This index is mapped by the eNodeB to locally defined configuration in order to apply specific radio resource management (RRM) strategies (e.g. to define RRC IDLE mode priorities and control inter-RAT/inter frequency handover in RRC_CONNECTED mode). What this means is that the SPID may be used by the access network to: a) derive UE specific cell reselection priorities to control idle mode camping; and b) decide on redirecting active mode UEs to different frequency layers or RATs. The MME/SGSN receives the subscribed RFSP Index per standard procedure from a home subscriber server (HSS) (e.g., during the Attach procedure). The MME/SGSN may also, according to standard procedures, provide a different value than the one received from HSS/HLR to the MCD and RAN. The MME/SGSN would, as an example of a mobility control action, select a specific SPID/RFID value to be provisioned to the MCD 101 and RAN 102 when the MCD 101 enters a location that matches the location definition of a received MMC rule 503.

The congestion and overload control actions may include performing a certain action when LANN 191 detects a potential congestion or overload situation, such as, for example, reconfiguring a load balancer or instantiating additional resources.

Figure 5:
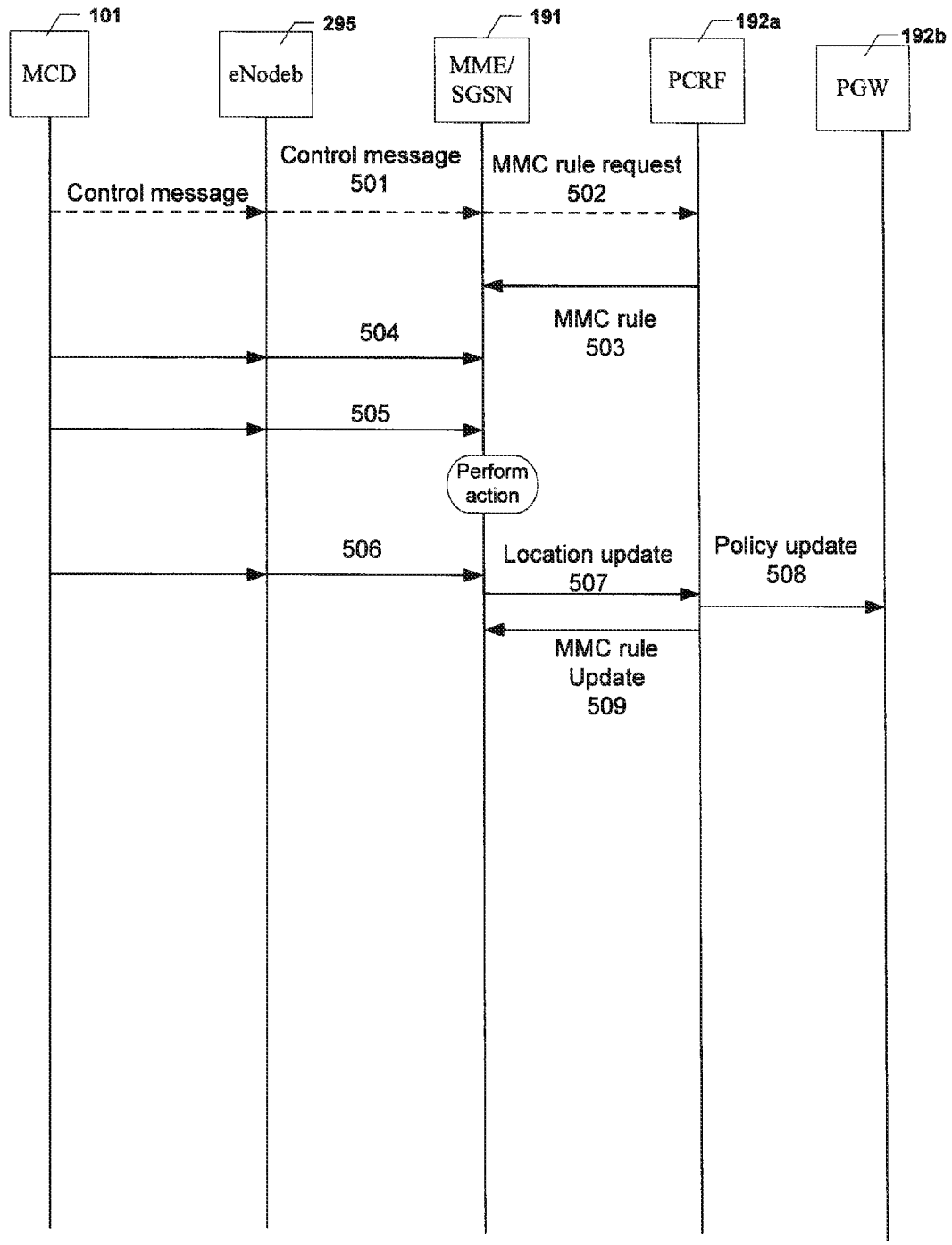
FIG. 5. illustrates an example message flow diagram according to one embodiment.

In step 304, LANN 191 receives from a network node of RAN 102 a message (e.g., one of messages 504, 505, and 506 of FIG. 5). The message may have been originally transmitted by MCD 101. The message received in step 304 comprises mobility information related to MCD 101, which mobility information may identify a current location of MCD 101. Each of messages 504, 505, and 506 may be any one of, for example: a tracking area update (TAU) Request, a routing area update (RAU) Request, a UE Service Request, a Handover Request, a Handover Required message, a Cell Notification or Location Report message, etc.

In step 306, LANN 191 determines whether it should perform one or more actions specified in MMC rule 503. In some embodiments, this determination is based on whether the mobility information included in the message received in step 304 indicates that MCD 101 is currently located within an area specified in MMC rule 503.

In step 308, in response to determining that it should perform an action specified in MMC rule 503, LANN 191 performs the action. As mentioned above, this action may include: a mobility information reporting control action, a mobility management control action, and a congestion and overload control action.

Figure 4:
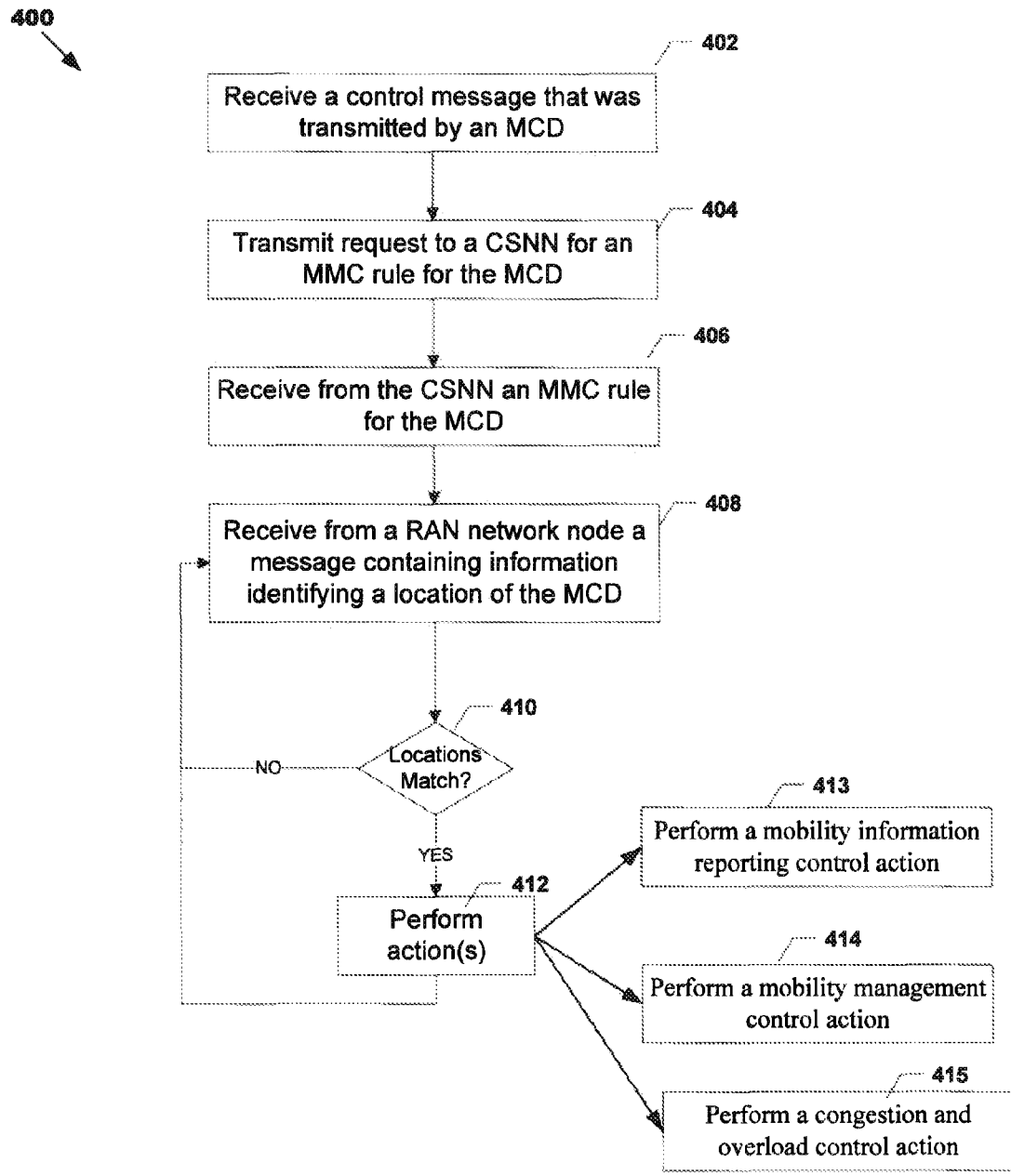
FIG. 4 is a flow chart illustrating a process according to some embodiments.

Referring now to FIG. 4, FIG. 4 is a flow chart illustrating another process 400 for reducing location update signaling within CN 104 of mobile communication network 100.

Process 400 may begin with step 402, where LANN 191 (e.g., MME/SGSN/TWAG) receives from MCD 101 via a RAN network node (e.g., network node 292, 294, or 295) a control message 501 (see FIG. 5), such as, for example, a control message containing information indicating that MCD 101 has attached, or is attempting to attach, to the network 100, or, as another example, a control message containing information indicating that MCD 101 has requested the establishment of a packet data network PDN connection. In some embodiments, control message 501 may be on of: i) an Attach Request, ii) an Activate PDP Context Request, iii) a PDN Connectivity Request, iv) a Tracking Area Update, and v) a Routing Area Update.

In step 404, LANN 191 transmits a mobility management and control (MMC) rule request 502 to CSNN 192 for an MMC rule for the MCD 101. In some embodiments, step 404 is performed by LANN 191 in response to receiving the control message 501 described above. In some embodiments, LANN 191 is configured to send the request 502 in response to detection of a request triggering event. Examples of request triggering events include: a) MCD 101 changing the RAT that is using to communicate with CN 104; b) MCD 101 entering a different time zone; c) an update in subscription data for MCD 101 received from a Home Location Register/Home Subscriber Server (HLR/HSS); and d) MCD 101 changing location.

In step 406, LANN 191 receives from the control system network node an MMC rule 503 for the MCD.

In step 408, LANN 191 receives from a network node of RAN 101 a message (e.g., message 504, 505, 506) containing mobility information related to MCD 101. In this example use case the mobility information consists of location information identifying a current location of MCD 101.

In step 410, LANN 191 determines whether the location identified by the location information included in the message received in step 408 matches a location in MMC rule 503 received in step 406. That is, for example, LANN 191 determines, based on the location information included in the message received in step 408, whether MCD 101 is currently located in an area specified in MMC rule 503. If the locations match, then process 400 proceeds to step 412, otherwise process 400 returns to step 408.

In step 412, in response to determining that the locations match, LANN 191 performs the set of actions specified in MMC rule 503 that are associated with the location. As mentioned above, step 412 may include one or more of: performing a mobility information reporting control action 413, performing a mobility management control action 414, and performing a congestion and overload control action 415.

In the example use case shown in FIG. 5, the set of actions includes LANN 191 sending a location update 507 directly to PCRF 192a in response to receiving message 506 and determining that message 506 includes information indicating that MCD 101 is currently located within an area specified by MMC rule 503 (that is, MMC rule associates the action "send location update" with the specified area so that when MCD 101 enters the specified area, LANN 191 will send a location update). In this example use case, an interface exists between LANN 191 and CSNN 192 that enables the two nodes to communicate directly. In some embodiments, in response to receiving message 507, PCRF 192a may i) use a Gx interface between it and the PGW/GGSN 192b to provide to the PGW/GGSN 192b a message 508 comprising information pertaining to an updated policy decision containing applicable service and charging policies for this location and ii) send to MME 191 an MMC rule update message 509 that includes an MMC rule update (e.g., information that causes MME 191 to update an MMC rule that it has previously received from PCRF 192a).

In some embodiments, the location definition part of the MMC rule may be "wild carded" (i.e. set to match any location). If this is done it means that the associated action definition is always valid (and independent of location). In some embodiments, it is possible to activate multiple MMC rules for a single MCD or a single PDN connection used by the MCD. If so, then all such rules may be evaluated independently. That is, the location identified in the message from the RAN node may match multiple MMC rules.

The MMC rules may be authorized per PDN connection and should be forwarded to the next MME during context transfer procedure (for idle mode) and handover procedure (for active mode). For example, the MME/SGSN may provide MMC-rules to a new MME/SGSN during MME/SGSN relocation.

Figure 6:
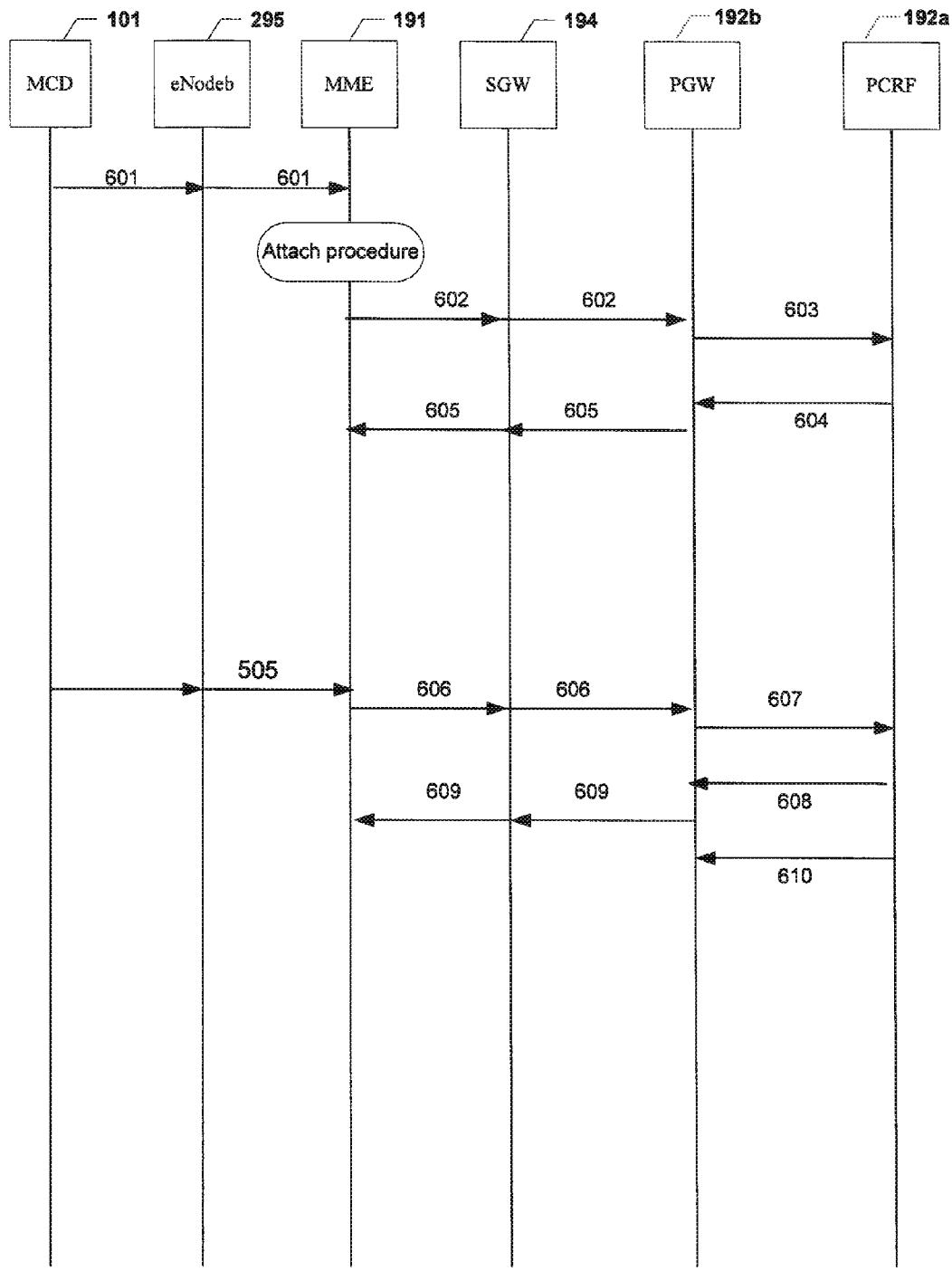
FIG. 6. illustrates another example message flow diagram according to another embodiment.

FIG. 6 illustrates another example use case. In this use case, unlike the one illustrated in FIG. 5, no direct interface between LANN 191 (e.g., MME 191) and PCRF 192a is defined; thus, MME 191 and PCRF 192a communicate through other nodes of CN 104, such as the SGW 194 and PGW/GGSN 192b. The use case illustrated in FIG. 6 is an LTE use case.

As illustrated in FIG. 6, MCD 101 transmits a control message 601 (in this use case the control message 601 is an Attach Request), which is received by the eNodeB 295 and forwarded to the MME 191. In response, MME 191, among other things, sends to SGW 194 a Create Session (or "Bearer") Request message 602 that includes an MMC rule request. The SGW 194 then forwards to the PGW/GGSN 192b the Create Session Request message 602. The PGW/GGSN 192b then sends to PCRF 192a a Credit Control Request (CCR) 603 containing the MMC rule request. The PCRF 192a responds by sending to the PGW/GGSN 192b a CCR response 604 including a transparent container information element (TCIE) containing an MMC rule. The MMC rule included in the TCIE of the CCR response 604 is transparent to PGW/GGSN 192b (e.g., PGW/GGSN 192b does not itself make use of the information contained in the TCIE). The TCIE included in CCR response 604 triggers PGW/GGSN 192b to sends to the SGW 194 a Create Session Response message 605 that also includes a transparent container IE containing the MMC rule 503. The MMC rule 503 included in the Create Session Response 605 is transparent to SGW 194. The transparent container IE included in message 605 triggers SGW 194 to forward message 605 to MME 191. In this way, MME 191 receives the MMC rule directly from SGW 194, which received the MMC rule 503 transparently from PGW/GGSN 192b, which received the MMC rule 503 transparently from PCRF 192a. The MME 191 then stores the rule 503, and, as described utilizes the rule in to receiving various messages containing location information.

At some later point in time, the eNodeB 295 transmits to the MME 191 a message 505 containing location information identifying the current location of MCD 101 (e.g., message 505 may be a Handover Required Message). In response to receiving the message 505, the MME 191 determines whether the location identified in the message 505 matches a location specified in MMC rule 503. In response to determining that the locations match, MME 191 performs the set of actions specified in the MMC rule 503 that is associated with the specified location. These actions may include the MME 191 sending a location update to the PCRF 192b.

As shown in FIG. 6, MME 191 may send the location update to PCRF 192a by sending to the SGW 194 a Modify Bearer Request message 606 that includes an information element (IE) containing information identifying the current location of the MCD 101. The IE included in the Modify Bearer Request message may be a transparent container IE (TCIE). In response, the SGW 194 forwards the message 606 to PGW/GGSN 192b. In response to receiving message 606, the PGW/GGSN 192b then sends to PCRF 192a a CCR 607 that includes the information identifying the current location of the MCD 101 (i.e., the information that was included in the TCIE of message 606). In response to the CCR 607, PCRF 192a may send to PGW/GGSN 192b a CCR response 608 that includes an MMC rule update (e.g., information that causes MME 191 to update an MMC rule that it has previously received from PCRF 192a). In response to the CCR response 608, PGW/GGSN 192b may send to SGW 194 a Modify Bearer Response 609 that includes the MMC rule update (the MMC rule update may be placed in a TCIE of Modify Bearer Response 609). In response to receiving Modify Bearer Response 609, SGW 194 may forward the Modify Bearer Response 609 to MME 191. In response to receiving the Modify Bearer Response 609, MME 191 uses the MMC rule update included in the MBR to modify an existing MMC rule that it has stored (e.g., MMC rule 503). PCRF 192a may also perform other actions, such as using a Gx interface between it and the PGW/GGSN 192b to provide to the PGW/GGSN 192b a message 610 comprising information pertaining to an updated policy decision containing applicable service and charging policies for this location.

Figure 7:
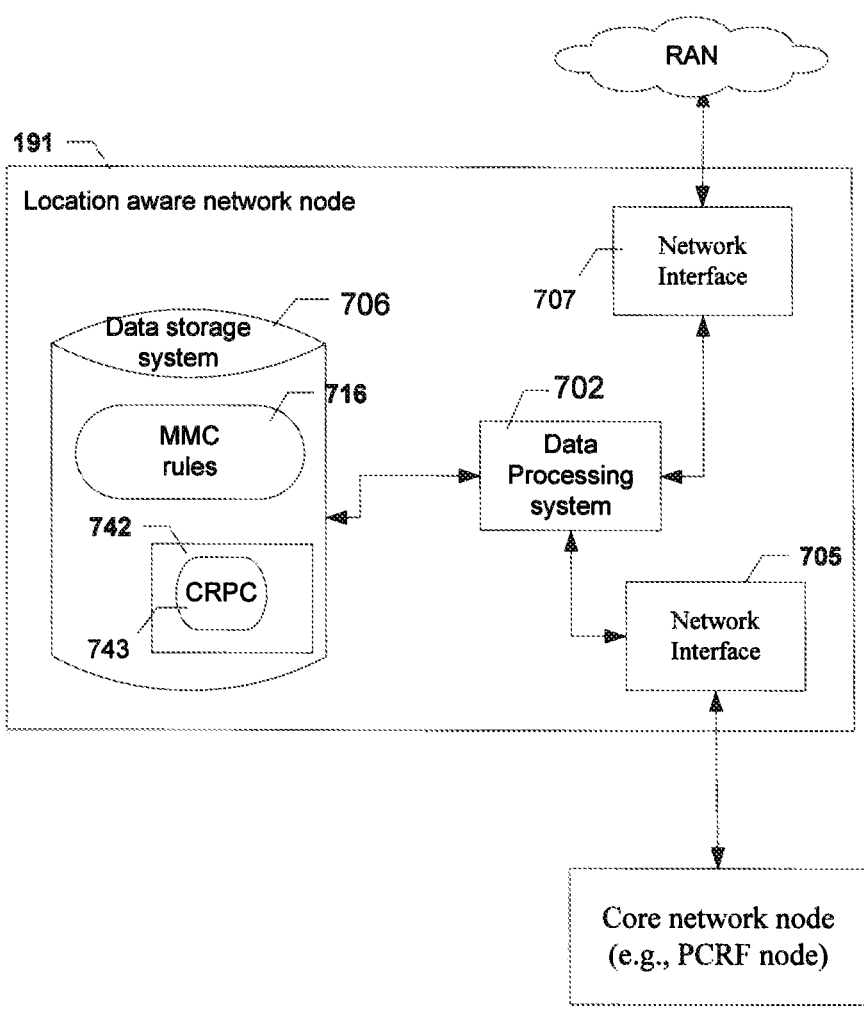
FIG. 7 is a block diagram of a location aware network node apparatus according to some embodiments.

Referring now to FIG. 7, FIG. 7 illustrates a block diagram of an exemplary LANN 191 apparatus, according to some embodiments. As shown in FIG. 7, LANN 191 apparatus may include: a data processing system 702, which may include one or more data processing devices (e.g., a blade server, a server computer, etc.) each having one or more processors (e.g., a microprocessor) and/or one or more circuits, such as an application specific integrated circuit (ASIC), Field-programmable gate arrays (FPGAs), etc.; a first network interface 705 for receiving messages from nodes within CN 104 (e.g., PCRF node) and for transmitting messages to nodes within CN 104; a second network interface 707 for receiving messages from RAN 102 and for transmitting messages to RAN 102; a data storage system 706, which may include one or more computer-readable data storage mediums, such as non-transitory data storage apparatuses (e.g., hard drive, flash memory, optical disk, etc.) and/or volatile storage apparatuses (e.g., random access memory (RAM)). As illustrated, data storage system 706 may be used to store a collection of MMC rules 716, which may include MMC rule 503.

In embodiments where data processing system 702 includes a processor (e.g., a microprocessor), a computer program product may be provided, which computer program product includes: computer readable program code 743 (e.g., instructions), which implements a computer program, stored on a non-transitory computer readable medium 742 of data storage system 706, such as, but not limited, to magnetic media (e.g., a hard disk), optical media (e.g., a DVD), memory devices, etc. In some embodiments, computer readable program code 743 is configured such that, when executed by data processing system 702, code 743 causes the processing system 702 to perform steps described above (e.g., steps describe above with reference to the flow charts shown in FIGS. 3-4).

In other embodiments, LANN 191 may be configured to perform steps described above without the need for code 743. For example, data processing system 702 may consist merely of specialized hardware, such as one or more application-specific integrated circuits (ASICs). Hence, the features of the embodiments described above may be implemented in hardware and/or software. For example, in some embodiments, the functional components of LANN 191 described above may be implemented by data processing system 702 executing program code 743, by data processing system 702 operating independent of any computer program code 743, or by any suitable combination of hardware and/or software.

Advantages

This disclosure provides a framework for Mobility Management and Control that may be used to create location dependent polices in e.g. the SGSN and MME. The framework provides a flexible method for location reporting by allowing for reporting of locations only when this is of interest to the subscribing entity (e.g. the PCRF). Additionally, the framework also allows for dynamic areas to be defined in order to account for use cases when location specific areas are user specific (e.g. home area).

The disclosure also describes how policies associated with specific locations during certain conditions may be outsourced to LANN 191. The result of this is that it reduces the need for the LANN 191 to send location update reports to other nodes within the CN 104.

While various embodiments have been described above, it should be understood that they have been presented by way of example only, and not limitation. Thus, the breadth and scope of this disclosure should not be limited by any of the above-described exemplary embodiments. Moreover, any combination of the above-described elements in all possible variations thereof is contemplated by this disclosure unless otherwise expressly indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a location aware network node, the method comprising:
the location aware network node receiving from a second network node a mobility management and control, MMC, rule, wherein the MMC rule comprises i) location information and ii) action information specifying a set of one or more actions, wherein the action information is associated with the location information;
the location aware network node receiving from a radio access network (RAN) network node a message comprising mobility information related to a mobile communication device, MCD;
the location aware network node, in response to receiving the message, using i) the location information included in the MMC rule and ii) the mobility information included in the received message to determine whether the location aware network node should perform the set of one or more actions specified by the action information included in the MMC rule; and
the location aware network node performing the set of one or more actions specified by the action information included in the MMC rule in response to determining that it should perform the actions.

2. The method of claim 1, wherein:
the location information included in the MMC rule specifies a set of one or more locations,
the mobility information included in the received message comprises second location information identifying a location within which the MCD is located, and
the step of using i) the location information from the MMC rule and ii) the mobility information to determine whether to perform the set of one or more actions comprises: using the second location information to determine whether the MCD is located in a location included in the set of one or more locations specified by the location information from the MMC rule.

3. The method of claim 2, wherein the location information included in the MMC rule includes a preconfigured location definition that references location information previously stored in the location aware network node.

4. The method of claim 2, wherein the location information included in the MMC rule includes a dynamic location definition that includes one or more of: 1) a list of one or more tracking areas, 2) a list of one or more base station identifiers, 3) a list of one or more cell identifiers, 4) a list of routing area identifiers, and 5) a list comprising one or more of a set of Service Set Identifiers, SSIDs, and a set of basic SSIDs, BSSIDs.

5. The method of claim 1, wherein, prior to receiving the MMC rule, the location aware network node transmits a request for an MMC rule for the MCD, wherein the MMC rule is specific to the MCD.

6. The method of claim 5, wherein the location aware network node transmits the request for the MMC rule in response to receiving a control message transmitted by the MCD.

7. The method of claim 6, wherein the control message is one of: an Attach Request message, an Activate PDP Context Request, a PDN connectivity request, a Tracking Area Update, and a Routing Area Update.

8. The method of claim 5, wherein the location aware network node transmits the request for the MMC rule in response to detecting a certain event related to the MCD.

9. The method of claim 8, wherein the certain event related to the MCD is one of: a RAT-change, a time zone change, subscription data change, and a location change.

10. The method of claim 5, wherein the location aware network node transmits the request for the MMC rule by transmitting to a SGW a control message that includes the request for the MMC rule, and the control message is one of: a Create Session Request message, a Modify Bearer Request message, a Change Notification Request message.

11. The method of claim 1, further comprising:
the location aware network node transmitting the received MMC rule to a second location aware network node as part of an inter mobility procedure.

12. The method of claim 1, wherein the action information included in the MMC rule includes one or more of:
a preconfigured action definition that references action information previously stored in the location aware network node, which previously stored action information includes a set of one or more action identifiers, each of which identifies a particular action, and
a dynamic action definition that includes a set of one or more action identifiers, each of which identifies a particular action.

13. The method of claim 1, wherein the location aware network node receives the MMC rule directly from the second network node.

14. The method of claim 1, wherein the location aware network node receives the MMC rule directly from a third network node that received the MMC rule transparently from a fourth network node that received the MMC rule transparently from the second network node.

15. The method of claim 14, wherein the third network node is a Serving Gateway, SGW, the fourth network node is a Packet Data Network Gateway, PGW, the second network node comprises a Policy and Charging Rules Function, PCRF, and the location aware network node is one of: i) a Mobility Management Entity (MME) and ii) a Serving GPRS Support Node, SGSN.

16. The method of claim 1, wherein:
the location aware network node is one of: a) a Mobility Management Entity, MME; b) a Serving GPRS Support Node, SGSN; and c) a Trusted WLAN Access Gateway, TWAG, and
the second network node is one of: a) a Policy and Charging Rules Function, PCRF; b) a Home Subscriber Server, HSS; and c) a Home Location Register, HLR.

17. The method of claim 1, further comprising:
prior to the location aware network node receiving the MMC rule, the location aware network node transmits to the second network node information indicating that the location aware network node is configured to process MMC rules.

18. A location aware network node (LANN) apparatus, comprising:
a first network interface for receiving a mobility management and control, MMC, rule transmitted by a second network node, wherein the MMC rule comprises i) location information and ii) action information specifying a set of one or more actions, wherein the action information is associated with the location information;
a second network interface for receiving from a radio access network (RAN) network node a message comprising mobility information related to a mobile communication device, MCD; and
a data processing system configured such that, after the LANN apparatus receives the MMC rule and the message, the data processing system performs a process comprising:

using i) the location information included in the MMC rule and ii) the mobility information included in the received message to determine whether the data processing system should perform the set of one or more actions specified by the action information included in the MMC rule; and
performing the set of one or more actions specified by the action information included in the MMC rule in response to determining that it should perform the actions.

19. The LANN apparatus of claim 18, wherein:
the location information included in the MMC rule specifies a set of one or more locations,
the mobility information included in the received message comprises second location information identifying a location within which the MCD is located,
the step of using i) the location information from the MMC rule and ii) the mobility information to determine whether to perform the set of one or more actions comprises: using the second location information to determine whether the MCD is located in a location included in the set of one or more locations specified by the location information from the MMC rule, and
the action information included in the MMC rule includes one or more of: i) a preconfigured action definition that references action information previously stored in the location aware network node, which previously stored action information includes a set of one or more action identifiers, each of which identifies a particular action, and ii) a dynamic action definition that includes a set of one or more action identifiers, each of which identifies a particular action.

20. The LANN apparatus of claim 18, wherein,
the data processing system is further configured such that, prior to the LANN receiving the MMC rule and in response to a receipt of a control message transmitted by the MCD, the data processing system uses the first network interface to transmit a request for an MMC rule for the MCD, wherein the MMC rule is specific to the MCD, and
the control message is one of: an Attach Request message, an Activate PDP Context Request, a PDN connectivity request, a Tracking Area Update, and a Routing Area Update.

* * * * *

UNITED STATES PATENT AND TRADEMARK OFFICE
CERTIFICATE OF CORRECTION

Page 1 of 1

PATENT NO. : 9,185,544 B2
APPLICATION NO. : 13/870776
DATED : November 10, 2015
INVENTOR(S) : Stenfelt et al.

It is certified that error appears in the above-identified patent and that said Letters Patent is hereby corrected as shown below:

In the specification

In Column 3, Line 44, delete "FIG. 5." and insert -- FIG. 5 --, therefor.

In Column 3, Line 46, delete "FIG. 6." and insert -- FIG. 6 --, therefor.

In Column 5, Line 30, delete "RRC IDLE" and insert -- RRC_IDLE --, therefor.

In Column 6, Line 39, delete "RAN 101" and insert -- RAN 102 --, therefor.

In Column 8, Line 6, delete "PCRF 192b." and insert -- PCRF 192a. --, therefor.

Signed and Sealed this
Eighth Day of March, 2016

Michelle K. Lee
*Director of the United States Patent and Trademark Office*